United States Patent [19]

Masaki et al.

[11] Patent Number: 4,899,331
[45] Date of Patent: Feb. 6, 1990

[54] RANDOM REPRODUCING SYSTEM FOR DISK PLAYER

[75] Inventors: Naoki Masaki; Masayuki Yoshida, both of Saitama, Japan

[73] Assignee: Pioneer Electronic Corporation, Tokyo, Japan

[21] Appl. No.: 113,693

[22] Filed: Oct. 26, 1987

[30] Foreign Application Priority Data

Oct. 24, 1986 [JP] Japan .................................. 61-163431
Oct. 31, 1986 [JP] Japan ............................ 61-260424[U]

[51] Int. Cl.$^4$ ....................... G11B 17/22; G11B 27/19
[52] U.S. Cl. ...................................... 369/32; 369/33; 369/34
[58] Field of Search ....................... 369/32, 33, 34, 36, 369/38

[56] References Cited

U.S. PATENT DOCUMENTS 4,667,314  5/1987  Iwashima .............................. 369/32

Primary Examiner—Steven L. Stephan
Attorney, Agent, or Firm—Sughrue, Mion, Zinn, Macpeak & Seas

[57] ABSTRACT

A disk player providing random disk or piece selection upon turning on of the power supply. According to one aspect of the invention, a piece on an available disk is randomly selected as soon as the disk player is turned on. According to another aspect of the invention, particularly applicable to multi-disk players, the random number is formed by a counter running at a fast rate. When the power is turned on, the counter is started and a mechanical component begins movement toward another position. Only when the component is detected to have arrived, is the counter read to provide the random number for disk or piece selection.

4 Claims, 3 Drawing Sheets

RANDOM REPRODUCING SYSTEM FOR DISK PLAYER

BACKGROUND

1. Field Of The Invention

This invention relates to a timer player device in a disk player such as a CD (compact disk) player.

This invention also relates to a random reproducing system for a multi-disk player.

2. Background Of The Invention

The timer play function of a conventional CD player is such that, when the power switch is turned on, the pieces of music recorded on the CD disk are automatically selected and played beginning with the first piece of music.

As described above, in the conventional CD player's timer play function, the pieces of music recorded on a disk are played one after another beginning from the first piece of music at all times. It is monotonous for the operator to listen to the same piece of music every time the disk is played by timer play.

In a reproducing system for a multi-disk player, a plurality of disks are accommodated and the disks thus accommodated are successively played. One type of such a multi-disk system is a so-called "random reproducing system" in which a random number is obtained to select one of a plurality of pieces of music recorded on a disk so that a plurality of pieces of music are played in an order that is set at random. In the random reproducing system, a random number determining method is employed in which a count pulse having an extremely short period is supplied to a counter, and the output data of the counter is latched with timing independent of the count pulse, to thereby obtain the random number.

On the other hand, there has been proposed a method in which a timer or the like is used so that, after the power switch is turned on, the random reproducing operation is automatically started. However, the method suffers from a difficulty that since the time interval which lapses from the time instant that the counting operation of the counter is started until the output data of the counter is latched is determined by regular electronic operations in predetermined program steps. Therefore, the output data of the counter provided immediately after the power switch is turned on is constant which adversely affects the desired random effect.

SUMMARY OF THE INVENTION

Accordingly, an object of this invention is to eliminate the above-described difficulty accompanying a conventional disk player such as a CD player. More specifically, an object of the invention is to provide a timer play device for a disk player which has eliminated the above-described difficulty that the same piece of music is played at all times, so that the operator can enjoy the timer play without boring repetition.

Another object of this invention is to provide a random reproducing system in which the randomness is maintained even in the selection of a piece of music immediately after the power switch is turned on.

A timer play device in a disk player according to one aspect of the invention comprises means for extracting, when a disk is available on the disk player for reproduction, the numerical designations of pieces of music recorded on the disk and a controller which selects one of the numbers for the pieces of music at random by using a random number generator and causes the disk player to automatically play the piece of music having the number thus selected.

When it is detected that a disk is loaded on the disk player which has been activated, the disk is rotated and the TOC data is read out of the disk so that one of the pieces of music recorded on the disk is selected at random by using a random number. This randomly selected piece is then played by the disk player.

The specific feature of a random reproducing system for a multi-disk player according to a second aspect of the invention resides in that a numerical value forming operation and a moving operation are both started when a power switch is turned on. In the numerical forming operation, a numerical value is formed which changes at predetermined time intervals. In the moving operation, a selecting and conveying means adapted to conveying a recording disk from a selected one of a plurality of recording disk accommodation positions to a disk playing position is moved to a predetermined position. Data is reproduced which is recorded on a recording disk indicated by the output of the numerical value forming means at the completion of the moving operation.

PREFERRED EMBODIMENTS OF THE INVENTION

One example of a timer play device for a disk player according to the first aspect of this invention will be described with reference to the accompanying drawings.

Figure 1:
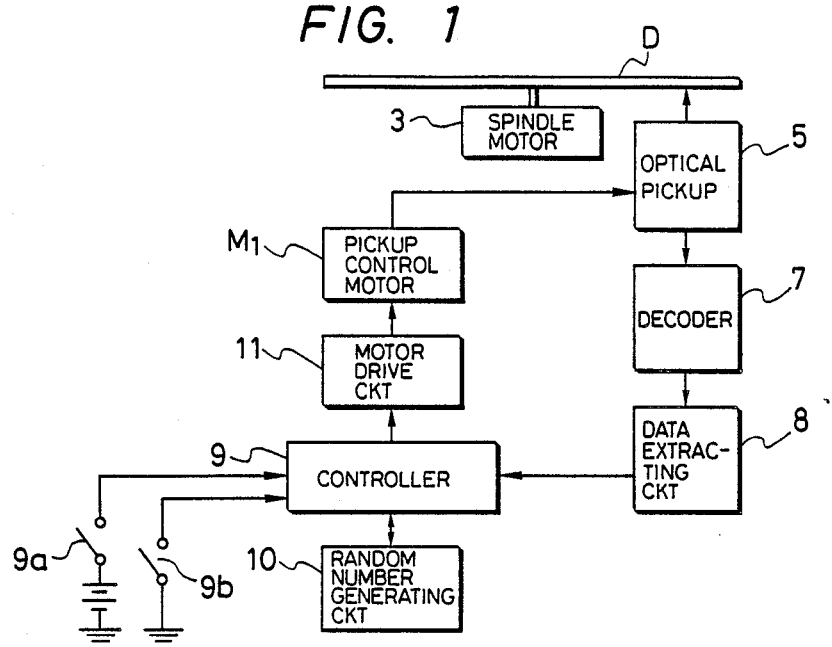
FIG. 1 is a block diagram showing the arrangement of one example of a timer play device in a disk player according to one aspect of this invention.

FIG. 1 is a block diagram showing the example of the timer play device according to the invention. FIG. 1 shows a recording disk D. The disk D is rotated by a spindle motor 3 at predetermined speed so that the signals recorded on it are reproduced.

The signals recorded on the disk D are read with an optical pickup 5. The signal thus read are applied through a decoder 7 to a data extracting circuit 8.

The data extracting circuit 8 operates to extract the address data of pieces of music recorded on the disk from the signals read from the disk D and to apply them to a controller 9.

The controller 9 has a random number generator 10 inside or outside. In response to a random number provided by the random number generator 10, the controller 9 selects, at random, one of the pieces of music recorded in the recording disk D and drives a motor drive circuit 11.

Upon reception of an operation instruction signal from the controller 9, the motor drive circuit 11 drives a pickup control motor $M_1$. As a result, a pickup moving mechanism (not shown) is operated.

The spindle motor 3 rotates the disk D according to an instruction signal from the controller 9.

Figure 2:
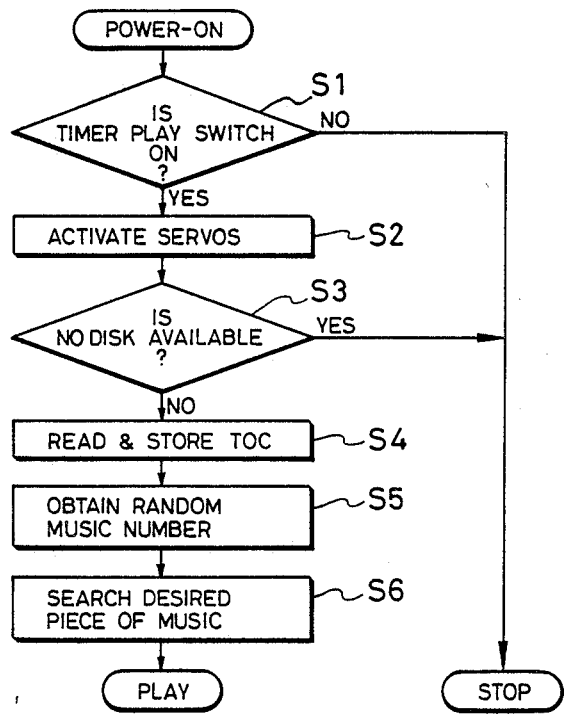
FIG. 2 is a flow chart for a description of the operation of the, timer play device shown in FIG. 1.

The operation of the disk player's timer play device thus organized will be described with reference to a flow chart of FIG. 2.

When a power switch 9a of the CD player is turned on, the controller 9 determines whether or not a timer play switch 9b has been turned on (step S1). When it is determined that the timer play switch 9b has been turned on, then step S2 is executed. The operation of step S1 is not always required. That is, an automatic timer play function may be utilized which can eliminate the use of the switch 9b.

In step S2, the controller 9 operates to activate focus, tracking and spindle servos and to place the CD player in the reproduction state.

When, in this case, no disk D is available (step S3), the player is stopped. The availability of a disk D can be determined by whether the servos have become locked. When the disk D is available and all the servos are normally activated, the TOC data recorded in the disk D are read (step S4), and one of the pieces of music recorded is selected at random according to the output of the random number generator 10, i.e., a random music number is obtained (step S5).

In this connection, a random number is generated as follows. The count value of a counter which changes with a short constant period is detected with given timing (for instance, when reading the TOC data has been accomplished). Alternatively, a pseudo-random number is determined according to a certain mathematical expression. Then, one (1) is added to the remainder provided when the count value thus detected or the pseudo-random number thus determined is divided by the number of pieces of music recorded.

The controller 9 applies an instruction signal to the motor drive circuit 11 to drive the pickup control motor $M_1$ to thereby operate the optical pickup 5. As a result, the piece of music having the random number thus obtained is selected (step S6) and played.

As was described above, when the power switch is turned on, a piece of music selected with a random number is automatically played. After the piece of music thus selected has been played, the following piece of music may be played or another piece of music may be selected at random again.

While the invention has been described with reference to an ordinary CD player, it should be noted that the technical concept of the invention is applicable, for instance, to a video disk player having a timer play function. The invention can be more effectively applied to a magazine type CD player in which a plurality of disks can be loaded, and disk numbers and music numbers are selected with random numbers in the timer play operation.

Another embodiment of this invention according to its second aspect will be described with reference to the accompanying drawings.

Figure 3:
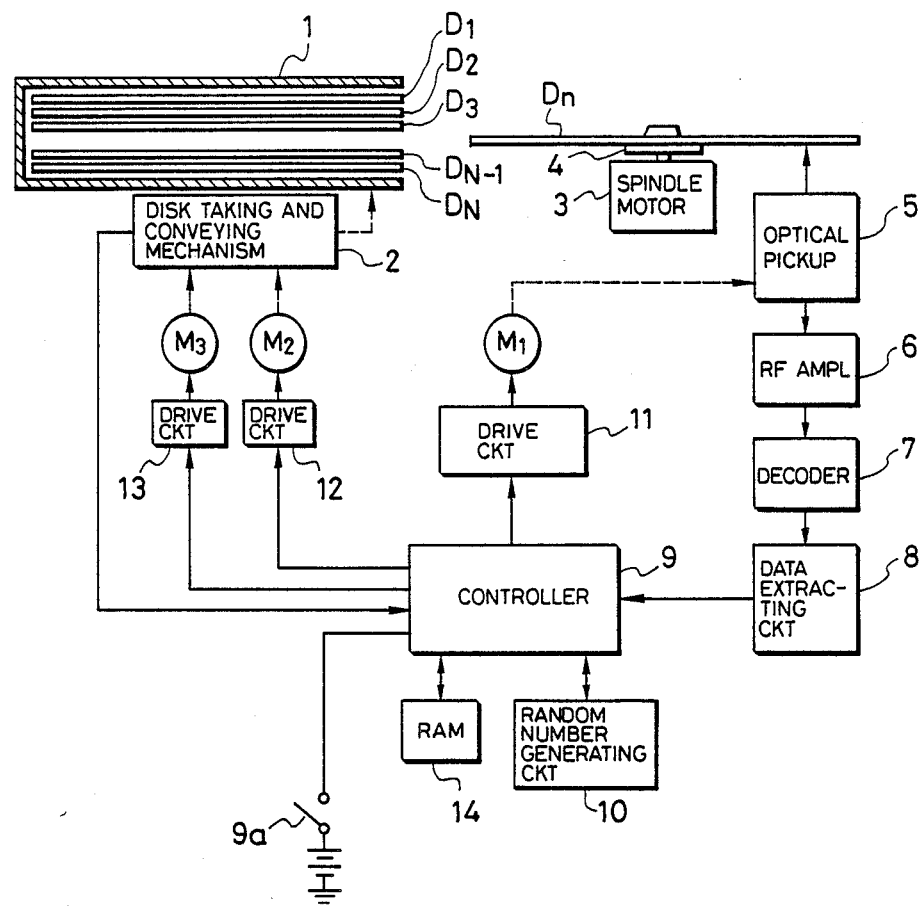
FIG. 3 is a block diagram showing a second embodiment of this invention.

In FIG. 3, N disks $D_1$, $D_2$, . . . - $D_N$ (N being an integer of two (2) or more) are arranged in a magazine 1 with a predetermined pitch. The magazine 1 has N trays for bearing the disks. The trays can go in and out of the magazine 1. The magazine 1 is detachably loaded in a predetermined magazine loading section. One of the N disks $D_1$ through $D_N$ loaded respectively on the N trays (disk receiving means) of the magazine 1 is moved over to the disk bearing surface of a turntable 4 and clamped to it by a disk taking and conveying mechanism 2. The turntable 4 is fixedly fitted on the rotary shaft of a spindle motor 3.

The disk taking and conveying mechanism 2 includes the following elements. A protruding member protrudes a tray out of the magazine 1 and conveys the disk from the tray over to the disk bearing surface of the turntable 4. A clamping mechanism clamps the disk thus moved over to the disk bearing surface. A moving plate changes the position of the protruding member relative to the magazine 1 in the direction of arrangement of the disks. Sensors detect the position of the moving plate and the operation of the clamping mechanism. The moving plate of the disk taking and conveying mechanism 2 is operated to change the position of the protruding member so that one of the disks is selected. The construction of the magazine 1 and the disk taking and conveying mechanism 2 has been described in detail in the laid-open Japanese patent application No. 14369/87 published on Jan. 22, 1987.

The data recorded on a disk $D_n$, which is taken out of the magazine 1 and clamped on the disk bearing surface of the turntable 4 by means of the disk taking and conveying mechanism 2, is read by an optical pickup 5. The optical pickup 5 comprises a laser diode, an objective lens, a focus actuator, a tracking actuator, and a photo-detector. The focus actuator and the tracking actuator of the pickup 5 are driven by output error signals of a focus servo circuit (not shown) and a tracking servo circuit (not shown), respectively. In these circuits, an output of the pickup 5 is utilized to form the error signals.

The output of the pickup 5 is supplied through an RF amplifier 6 to a decoder circuit 7. The decoder circuit 7 comprises, for instance, an EFM (eight to fourteen modulation) demodulation circuit. The data decoded by the decoder circuit 7 are applied to a data extracting circuit 8, where they are classified into control data indicating music-playing, inter-music, music number, play time and address, and audio data. The audio data is converted into an audio output, for instance, by a D/A converter (not shown). The control data is applied to a controller 9, which receives various detection signals from the disk taking and conveying mechanism 2, the output data of a random number generating circuit 10, and a random reproduction instruction from an operating section (not shown).

The random number generating circuit 10 is so designed that, for instance, the output of a counter whose count value changes with a considerably short period, after being latched in response to a random number forming instruction, is provided. The controller 9 comprises at least one microcomputer including a processor, a ROM (read-only memory) and an interface circuit. In the controller 9, the processor operates according to a program which is formed according to a flow chart of FIG. 4. The controller 9 thereby processes the various detection signals of the disk taking and conveying mechanism 2 and the output data of the random number generating circuit 10 in order to apply instructions to motor drive circuits 11, 12 and 13. The motor drive circuit 11 is so designed that it supplies drive current to a motor $M_1$ according to the instruction. The motor $M_1$ is used to move a slider (not shown) bearing the pickup 5 in the radial direction of the disk. The motor drive circuits 12 and supplies drive currents to motors $M_2$ and $M_3$ respectively according to the instructions. The motors $M_2$ and $M_3$ are adapted to drive the moving plate and the protruding member of the disk taking and conveying mechanism 2, respectively. Further in FIG. 3, a RAM (random access memory) 14 stores data provided by the controller 9.

Figure 4:
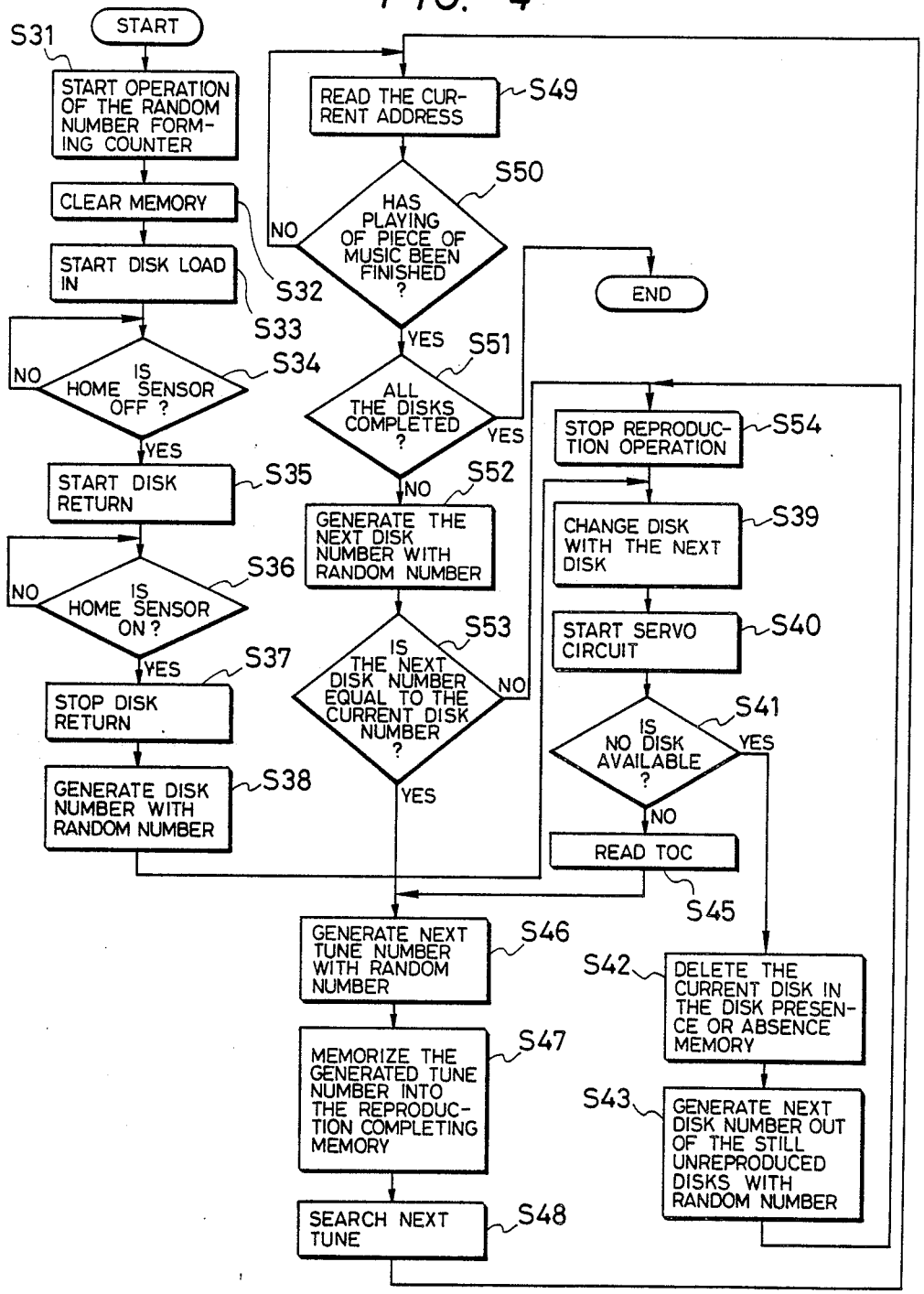
FIG. 4 is a flow chart for a description of the operation of the embodiment shown in FIG. 3.

The operation of the processor in the controller 9 will be described according to the flow chart of FIG. 4.

When the power switch is turned on, step S31 is executed. That is, the count-up operation of the random number forming counter in the random number generating circuit 10 is started. Then, the operation of the process is shifted to step S32 in which the region set as play completion memory in the RAM 14 is placed in an initial state with the contents reset (or cleared). Thereafter, step S33 is executed. That is, an instruction is applied to the drive circuit 13 so that the disk is moved from the magazine 1 to the disk bearing surface of the turntable 4 and the protruding member of the disk taking and conveying mechanism 2 is moved. In the next step S34, it is determined whether or not the detection output of a home sensor for detecting the arrangement of the protruding member of the mechanism 2 at a predetermined reference position (or home position) is absent.

When in step S34 it is determined that the detection output of the home sensor has not been turned off, the processor repeats the operation of step S34. Only when it is determined that the detection output of the home sensor has been eliminated, does execution proceed from step S34 to step S35. In step S35, the protruding member of the disk taking and conveying mechanism 2 is moved in a direction opposite to the direction of its movement in step S33. Thereafter, in step S36 it is determined whether or not the home sensor has produced the detection output. When it is determined that no detection output has been produced by the home sensor, the processor repeats the operation of step S36. Only when it is determined that the home sensor has produced the detection output, does execution proceed from step S36 to step S37, in which the movement of the protruding member of the disk taking and conveying mechanism 2 is stopped.

Thereafter, step S38 is executed. That is, one of a plurality of disks to be put in place in the magazine 1 is selected according to the data which is obtained in response to a random number generating instruction applied to the random number generating circuit. This step will be described in more detail. The number (N) of disks which can be accommodated in the magazine 1 is repeatedly subtracted from the output (X) of the random number generating circuit 10, in which the output of the counter whose count value changes with a considerably short period is latched, until the subtraction cannot be performed any longer. The remainder (K) is so obtained (i.e., K is the remainder when X is divided by N). In this case, the value (K+1) obtained by adding one (1) to the remainder (K) is a random number between 1 and N. Accordingly, counting the disk numbers of the disks available up to the value (K+1) can select one of the available disks at random. That is, a random disk number is determined.

Thereafter, step S39 is executed. In step S39, instructions are applied to the motor drive circuits 12 and 13 so that a disk having a disk number determined in step S38 or step S43 or S52 (described later) is moved over to the turntable 4 and clamped on the disk bearing surface. In the next step S40, the processor supplies instructions to the servo circuits to start the servo circuits. Under this condition, step S41 is switched over to step S41. In step S41, the presence and absence of the disk is determined according, for instance, to whether or not the focus servo has been locked within a predetermined period of time. When in step S41 it is determined that no disk is available, step S42 is executed. That is, the fact that the disk having the newly determined disk number is not available is stored in the region which is provided as disk presence or absence memory in the RAM 14. Thereafter, in step S43, the data obtained with the random number generating instruction applied to the random number generating circuit 10 is utilized to determine one of a plurality of disk numbers which indicate the remaining disks, respectively, which are obtained by subtracting the disk which has been stored as an unavailable disk from the disks to be put in place in the magazine 1.

The operation in step S43 will be described in more detail. The number (n) of disks which has been stored in the disk presence or absence memory is counted. Thereafter, the value (n) is repeatedly subtracted from the output (X) of the random number generating circuit 10, in which the output of the counter whose count value changes with an extremely short period is latched, until the subtraction cannot be performed any longer. The remainder (m) is thereby obtained (i.e., m is the remainder provided when X is divided by n). Accordingly, counting the disk numbers of the disks available up to the value (m+1) can select one out of the available disks at random. That is, a random disk number is determined.

Execution then advance from step S43 to step S44, in which instructions are applied to the servo circuits to stop the reproducing operation. Thereafter, step S39 is effected again.

When, in step S41, it is determined that the disk is available, step S45 is executed. In step S45, TOC data recorded in the innermost periphery of the disk to indicate the number of pieces of music recorded and their positions are provided by the data extracting circuit 8. Then, step S46 is executed in which the random number generating circuit 10 determines one of a plurality of music numbers which indicate the respective pieces of music recorded. The operation of step S46 will be described in more detail. In the processor, the start music number and the end music number included in the TOC data are utilized to calculate the number of pieces (p) of music recorded, and then the value (p) is repeatedly subtracted from the output (y) of the random number generating circuit until the subtraction cannot be performed any longer. The remainder (q) is thereby obtained (i.e., q is the remainder provided when y is divided by p). In this case, the sum (q+STNO) of the remainder (q) and the start music number (STNO) is a random track number between the start music number and the end music number.

In the following step S47, the music number determined in step S46 is stored, as the number of a piece of music which has been played, in a region which is set, as play completion memory, in the RAM 14. Under this condition, step S48 is effected. That is, in step S48, an instruction is applied to the motor drive circuit 11 so that the data detecting light spot of the pickup 5 is moved to the position where the piece of music having the music number determined in step S46 is recorded and the piece of music is then begun to be played.

Thereafter, execution advances from step S48 to step S49, in which the address data extracted by the data extracting circuit is read. In the next step S50, it is determined according to the address data obtained in step S49 whether or not the playing of the piece of music has been finished. If it is determined that the playing of the music has not been finished yet, then step S49 is repeated. When in step S50 it is determined that the playing of the piece of music has been finished, step S51 is executed. In step S51, it is determined from the content of the play completion memory whether or not the playing of all the disks has been completed.

When in step S51 it is determined that all the disks have been played, the processor starts the execution of another routine. When in Step S51 it is determined that playing of all the disks has not been accomplished yet, step S52 is executed. In step S52, similarly as in step S43, one of a plurality of disk numbers which indicate the remaining disks, respectively, which are obtained by subtracting the disk which has been stored as an unavailable disk from the disks to be put in place in the magazine 1 is determined. In the next step S52, it is determined whether or not the disk number determined in step S51 is equal to the disk number of the disk being played. When in step S52 it is determined that the disk number determined in step S51 is equal to the disk number of the disk being played, step S46 is repeated. If in step S53 it is determined that the disk number determined in step S52 is not equal to the disk number of the disk being played, then step S44 is executed.

In the above-described operation, the operation of the counter of the random number generating circuit 10 is first started in step S31 and then the movement of the protruding member of the disk taking and conveying mechanism 2 to the predetermined reference position is carried out before the output data of the counter, being latched, is provided as the output of the random number generating circuit 10 in step S38. The position control of the protruding member of the disk taking and conveying mechanism 2 has a relatively low accuracy so that the time required for moving the protruding member is variable, and therefore the time from step S31 until step S38 is not constant as measured relative to the period of the counter of the random number generating circuit 10. Thus, in step S38, the data provided by the random number generating circuit 10 involves randomness. Accordingly, even immediately after the power switch is turned on, the randomness is maintained even under predetermined mechanical timing.

In the above-described embodiment, with the power switch turned on, the various steps are successively executed beginning with step S31. However, the embodiment may be so modified that a timer random play switch is provided so that, only when the switch is in "on" state, the various steps are executed beginning with step S31 with the power switch turned on.

Furthermore, the embodiment may be modified as follows. A backup power source is provided so that, when the power switch is turned off, the contents of the memories, such as for instance the RAM 14, are not erased, and the music numbers forming the program area for program play by the operator are selected at random.

In the above-described embodiment, the play completion memory is provided to store any piece of music played thereby to prevent the same piece of music from being played again. However, the play completion memory may be eliminated so that the same piece or pieces of music are repeatedly played, and the random reproducing operation is continued until the stop instruction is made by the operator.

In the above-described embodiment, the output of the random number generating circuit is used according to the detection output of the home sensor which detects whether or not the protruding member of the disk taking and conveying mechanism 2 is located at the predetermined reference position. However, for the same purpose, the output of any sensor in the disk taking and conveying mechanism or the disk player may be utilized if the sensor can provide irregular timing.

As was described above, in the disk player's timer play device according to the first aspect of the invention, pieces of music to be timer-played are selected by using random numbers, and therefore, any piece of music will never by played again. Therefore, the operator can enjoy the timer play with fresh impression at all times even when the disk is played again.

As was described above, in the random reproducing system for the multi-disk player according to the second aspect of the invention, the numerical value forming operation of forming a numerical value which changes at predetermined time intervals and the moving operation of moving the selecting and conveying means to the predetermined position (which is adapted to convey the disk from a selected one of the disk accommodating positions to the disk playing position) are started when the power switch is turned on. The data is then reproduced which is recorded on the recording disk indicated by the output of the numerical value forming means at the completion of the moving operation. Therefore, owing to the irregularity of time of the mechanical operation, the randomness in music selection is maintained even immediately after when the power switch is turned on. That is, the random data reproduction is automatically carried out even immediately after when the power switch is turned on.

What is claimed is:

1. A disk player, comprising:
   playing means for playing one disk of one or more disks and including a controllably movable mechanical component;
   numerical value forming means for forming a numerical value which changes at predetermined time intervals;
   means for starting said numerical value forming means and for controlling said mechanical component to begin movement from a first position to a second position;
   means for determining that said mechanical component has moved to said second position;
   means responsive to said determining means for reading a current value from said numerical value forming means when said mechanical component has moved to said second position and for using said current value for randomly selecting one piece from said one or more disks for playing by said playing means.

2. A multi-disk playing comprising:
   playing means for playing one of a plurality of recorded disks;
   storage means for storing said plurality of recorded disks;
   selecting and conveying means for selecting one of said plurality of stored disks and conveying said selected disk to a disk playing position of said playing means;
   numerical value forming means for forming a numerical value which changes at predetermined time intervals;
   means for starting said numerical value forming means and for causing a moveable component of said selecting and conveying means to begin movement from a first position to a second position;

means for determining that said moveable component of said selecting and conveying means has moved to said second position;

means responsive to said determining means to read a first current value from said numerical value forming means and to use said first current value for causing said selecting and conveying means to randomly select one of said plurality of disks for playing by said playing means.

3. A multi-disk player as recited in claim 2 further comprising means for reading a second current value from said numerical value forming means and for causing said playing means to select and play one of a plurality of pieces recorded on said selected disk according to said second current value.

4. A multi-disk player as recited in claim 2, wherein a period of said changes of said numerical value forming means is short compared to a period of said movement of said selecting and conveying means.

* * * * *